UNITED STATES PATENT OFFICE.

WOODBURY WENTWORTH AND GEORGE W. CLEAVELAND, OF CONSTABLE, NEW YORK.

IMPROVEMENT IN THE MANUFACTURE OF PEARLASHES.

Specification forming part of Letters Patent No. 130,613, dated August 20, 1872.

SPECIFICATION.

*To all whom it may concern:*

Be it known that we, W. WENTWORTH and GEO. W. CLEAVELAND, of Constable, in the county of Franklin and State of New York, have invented certain new and useful Improvements in the Manufacture of Pearlashes from Potashes; and we do hereby declare that the following is a full and exact description thereof.

Our invention consists of an improved method of changing the crude potash of commerce, or house-ashes, into pearlash.

The supply of potash from field-ashes is daily becoming more limited and precarious as the clearing of forest-lands and their cultivation progresses; hence a process for converting house-ashes into pearlash becomes of great importance, the difficulty being that the house-ashes are necessarily mixed with many impurities. Two patents have been granted for this purpose—one to B. F. Jewett, (No. 57,728, 4th September, 1866,) and one to J. Warren Brown (No. 62,312, February 26, 1867); but neither of these processes appear to produce the desired results in a thorough or reliable manner.

Our process may be briefly detailed as follows: We dissolve the salts or ashes in lye, and mix with the liquid certain proportions of finely-powdered bark, or spent tan-bark, when the moisture is evaporated by boiling. The residuum is then baked or scorched in an oven, during which process the bark is carried off by the heat. Our proportions vary, of course, with the quality of the ashes; but we usually take about three bushels of bark to one hundred pounds of black salts, and from five to ten bushels of bark to one barrel of potash.

Although we usually add the bark to the lye after it has been boiled down to salts, we do not confine ourselves to this method, as we sometimes add the bark before.

We have found that spent tan-bark, when used, gives the best results, for some reason with which we are unacquainted.

Our process has the following advantages over those referred to above: That the salts can be kept for a long time after drying down without "leaching" or "slacking," so that we are enabled to make large quantities of material and keep them on hand with perfect safety until we are ready to "pearl" them, thus effecting a great saving of expense, preventing loss of material, &c.

We are aware that black muck, charcoal, coke, coal, peat, and sawdust have been used for manufacturing pearlashes from potash or house-ashes; and the use of these substances we absolutely disclaim; but We do claim, and desire to secure by Letters Patent—

1. The use of crushed or ground bark in the manufacture of pearlashes, substantially as and for the purpose described.

2. The specific use of spent or exhaust tanbark in the manufacture of pearlash, substantially as hereinbefore described.

WOODBURY WENTWORTH.
GEORGE W. CLEAVELAND.

Witnesses:
H. E. SMITH,
ISAAC CHESLEY.